United States Patent [19]

Murkens

[11] Patent Number: 5,203,902
[45] Date of Patent: Apr. 20, 1993

[54] GLASS COMPOSITION FOR USE IN GLAZES OR ENAMELS

[75] Inventor: Johannes J. W. Murkens, Eijsden, Netherlands

[73] Assignee: Johnson Matthey Public Limited Company, United Kingdom

[21] Appl. No.: 796,834

[22] Filed: Nov. 25, 1991

Related U.S. Application Data

[62] Division of Ser. No. 431,888, Nov. 6, 1989, Pat. No. 5,093,285.

[30] Foreign Application Priority Data

Nov. 19, 1988 [GB] United Kingdom ............... 8827096
Sep. 15, 1989 [GB] United Kingdom ............... 8920941

[51] Int. Cl.$^5$ .............................................. C03C 17/02
[52] U.S. Cl. ................................. 65/60.53; 65/60.5; 65/104; 65/106; 65/107; 501/17
[58] Field of Search ............ 65/60.53, 60.5, 60.06, 65/60.2, 104, 106, 107; 501/21, 75, 77, 79, 18, 17; 428/428

[56] References Cited

U.S. PATENT DOCUMENTS

| | | | |
|---|---|---|---|
| 2,795,084 | 7/1955 | Littleton | 65/60.53 |
| 2,827,739 | 3/1958 | Atkeson | 65/107 |
| 2,942,992 | 6/1960 | Dumesnil | |
| 3,282,014 | 7/1964 | Bamford et al. | 65/60.53 |
| 4,554,258 | 11/1985 | Francel | 501/77 |
| 4,828,598 | 5/1989 | Imamura et al. | 65/104 |
| 4,892,847 | 1/1990 | Reinherz | 501/21 |

FOREIGN PATENT DOCUMENTS 0192844 9/1986 European Pat. Off.
2072159 9/1981 United Kingdom.

OTHER PUBLICATIONS

Glastechnische Berichte, Nov. 1959, vol. 11, pp. 437-442; Sep. 1958, p. 357 and vol. 8, p. 318 (English language translation).
Glastechnische Berichte, Nov. 1959, vol. 11, pp. 437-442; Sep. 1958, p.357 and vol. 8, p. 318.

*Primary Examiner*—Mark L. Bell
*Assistant Examiner*—Deborah Jones
*Attorney, Agent, or Firm*—Stevens, Davis, Miller & Mosher

[57] ABSTRACT

A glass flux composition consisting essentially by weight of 45-65% $Bi_2O_3$, 25-36% $SiO_2$, 4-6% $TiO_2$, 1-3% $Na_2O$, 0.5-2% $K_2O$, 2-6% $Li_2O$, 0-3% $Al_2O_3$, 0-1% $ZrO_2$, 0-1% BaO, 0-1% CaO, 0-1% MgO, 0-1% ZnO, 0-3% PbO and 0-0.5% CdO is useful for preparing a glaze or enamel composition especially for application to glass such that the composition is then fired in contact with a mould surface or with another glass surface.

17 Claims, 1 Drawing Sheet

GLASS COMPOSITION FOR USE IN GLAZES OR ENAMELS

This is a division of application Ser. No. 07/431,888 filed Nov. 6, 1989 now U.S. Pat. No. 5,093,285.

This invention relates to glass flux compositions for use in glazes or enamels.

Many different ingredients in many different concentrations in many different combinations are known in glass flux compositions or use in glazes or enamels in order to provide the properties desired. These fluxes are admixed with pigment to make the glazes or enamels for application to articles. A surprisingly useful new flux composition has now been discovered.

European patent specification EP-A-0192844 discloses frits for crystallising glazes, consisting by weight of 0-20% CaO, M$_0$O, SrO and/or BaO, 3-15% alkali metal oxide, 5-20% ZnO, 0-40% PbO, 0.1-8% Al$_2$O$_3$, 15-60% SiO$_2$, 5-25% B$_2$O$_3$, characterised in that they contain by weight 2-30% MoO$_3$ and also 0-40% Bi$_2$O$_3$. the total content of Bi$_2$O$_3$, PbO and/or alkaline earth metal oxides amounting to 5-40% by weight.

U.S. patent specification U.S. Pat. No. 4,554,258 refers to a glass frit composition free of Pb and As, the composition having a fibre softening point of at least about 535° C., having good chemical resistance and consisting essentially of, in parts by weight, 48-57 Bi$_2$O$_3$, 29-38 SiO$_2$, 3-8 B$_2$O$_3$ and 2-8 R$_2$O (alkali metal oxide) and up to: 2 TiO$_2$, 8 ZrO$_2$, 2 Al$_2$O$_3$, 4 BaO, 3 ZnO and 9 CaO; RO (alkaline earth metal oxide) being 0-about 9, R$_2$O$_3$ being about 57-64 and RO$_2$ being about 32-39, the composition having an alkaline resistance in weight % loss below about 0.9 and an acid resistance in weight % loss below about 0.9.

The present invention provides a glas flux composition consisting essentially by weight of 45-65% Bi$_2$O$_3$, 25-6% SiO$_2$, 4-6% B$_2$O$_3$, 3-6% TiO$_2$, 1-3% Na$_2$O, 0.5-2% K$_2$O, 2-6% Li$_2$O, 0-3% PbO and 0-0.5% CdO.

The invention provides also a glaze or enamel composition consisting essentially by weight of 70-90% of the glass flux composition together with 10-30% pigment.

The invention also provides an article bearing on its surface the glaze or enamel composition which has been fired thereon.

The invention provides also a method of applying a glaze or enamel composition to an article, which method comprises applying the present glaze or enamel composition to the article and then firing the composition.

The present flux composition produces a glaze or enamel composition which crystallises rapidly, and hence forms a matt finish. The fired composition is opaque. It bonds strongly to the underlying article. The glaze or enamel possesses great chemical and mechanical strength. The flux composition is particularly useful in glaze or enamel compositions which are to be fired on the underlying article while the composition is in contact with another surface, for instance a mould surface for the article. The composition surprisingly does not stick on the other surface during the firing, for instance to the mould during the firing and any bending, and this enables the article to be moulded and fired at the same time.

Increasingly, automotive vehicle glass window panes, for instance automobile glass window panes, bear an enamel decorative band along one or more sides. The band can comprise a pattern, for instance of dots. The band hides the unevenness of the adhesive used to bond the window pane in place in the vehicle body frame and protects the adhesive against UV-radiation, and on the rear window pane, particularly of automobiles, can be used also to hide (from the outside of the vehicle) the peripheral strips of a window pane heater.

Such a band can be applied as an enamel composition onto the surface of glass for a window pane of an automotive vehicle, which glass is then bent into the desired curved shape of the pane. In one technique, the bending is done by gravity over a mould frame, the heat at the same time both firing the enamel composition and allowing the glass to sink down into the frame and hence the shaping to occur. This technique employs a softer glass. The shaping by gravity can be aided by employing in addition a top half to the mould to press down from above. When the enamel composition is in contact with the mould, the enamel composition tends to stick to the mould and come off the glass. To alleviate this, one can powder the surface of the mould with a talc, but a problem remains in that some of the powder tends to adhere to the glass, which mars its appearance and weakens the bond between the enamel and the glass.

In a more modern technique, the band is applied as an enamel composition onto the surface of the glass which is then shaped by two halves of a mould, without any significant effect by gravity, into the desired curved shape, the heat again at the same time both firing the enamel composition and allowing the shaping to occur. Again, the enamel composition is in contact during its firing and bonding with the mould, and tends to stick to the mould and come off the glass.

The present flux composition, enamel composition containing it, and method overcomes the problem of the enamel composition sticking to the mould when the composition is fired in contact with it.

Accordingly, in a preferred embodiment, the present enamel composition is applied to the surface of glass for a window pane of an automotive vehicle, which glass is then shaped by two halves of a mould into the desired curved shape of the window pane while the composition is fired in contact with a surface of the mould.

In another preferred embodiment, the enamel composition can be employed in the manufacture of laminated window panes, particularly the front windscreen, of automotive vehicles, particularly automobiles. The laminated window panes have two sheets of glass sandwiching a transparent plastic sheet. Again, the enamel can be used as a decorative band along one or more sides to hide the unevenness of the adhesive used to bond the window pane in place in the vehicle body frame and to protect the adhesive against UV-radiation. In the present embodiment, the enamel composition is applied to the surface of one sheet of glass for a laminated window pane of an automotive vehicle, which sheet, together with the second sheet of glass for the laminated window pane, is then shaped by gravity into the desired curved shape of the window pane while the composition is fired in contact with the second sheet of glass. It has been discovered surprisingly that the composition does not stick to the second sheet of glass during the firing. This enables a laminated window pane to be made whose two sheets of glass fit extremely closely together with the enamel between them, because they are moulded by gravity (and the enamel composition fired) in this configuration. If the enamel composition stuck to the second sheet during firing, this would not be possible (the two sheets need to be separated to insert the transparent plastic layer); one could mould the two sheets of glass in contact with one another and with the enamel composition on one of the outer surfaces (providing the composition did not contact a mould surface to which it would stick during the firing), but on reassembling the sheets so that the enamel layer is between the two sheets of the glass, the two sheets generally would not fit so closely together because their curvature would not match so closely. This advance in the field of such laminated window panes for automotive vehicles enables such panes to be manufactured with increased curvature, where the less close fitting of the alternative method of manufacture referred to above would be unacceptable.

Another important feature of the use of the present enamel composition for firing in contact with the second sheet of glass of a laminated window pane of an automotive vehicle is in relation to heated front windscreens. The inner face of one of the sheets of glass in the glass-plastic-glass sandwich (i.e. the face nearer the plastic) can be provided with an electrically conductive coating which can be employed to heat the windscreen but which is thin enough to be transparent so that one can see through the windscreen. The coating needs to be between the sheets of glass because the coating is delicate. The coating is preferably on the inside of the outer sheet rather than the inside of the inner sheet to facilitate the heater being used to de-ice the windscreen. Electrical connections can be made to the coating by peripheral strips around the coating, preferably surrounding the coating as this spreads the heat through the coating more. Such strips can be for instance of silver provided by applying silver paste. Such strips are unsightly, however. The present enamel composition can be used to hide them (particularly from the outside of the automotive vehicle).

The present flux composition preferably contains 45–55% $Bi_2O_3$. Its $SiO_2$ content is preferably 27–35%. Its $TiO_2$ content is preferably 3–5%. Its $Li_2O$ content is preferably 4–6%. Its $Na_2O$ content is preferably 1.5–2.5%. Its $K_2O$ content is preferably 0.5–1.5%. Its total $R_2O_3$ content, where R represents a trivalent cation, is preferably 45–56%. Preferably, more than 50% of its alkali metal oxide content is $Li_2O$. Preferably, the composition consists essentially of the $SiO_2$, $Bi_2O_3$, $B_2O_3$, $TiO_2$, $Li_2O$, $Na_2O$ and $K_2O$, though optional ingredients which do not mar its essential character can also be present. The crystallising point of the composition is preferably 480°–600° C.

In a particular embodiment, the present flux composition consists essentially by weight of 45–65% $Bi_2O_3$, 30–36% $SiO_2$, 4–5% $B_2O_3$, 4–6% $TiO_2$, 1–3% $Na_2O$, 0.5–2% $K_2O$, 2–4% $Li_2O$, 0–3% $Al_2O_3$, 0–1% $ZrO_2$, 0–1% $BaO$, 0–1% $CaO$, 0–1% $MgO$, 0–1% $ZnO$, 0–3% $PbO$ and 0–0.5% $CdO$. The $SiO_2$ content of this composition can be for instance 32–36%. Its $TiO_2$ content can be for instance 4.5–5.5%. Its $Li_2O$ content can be for instance 3–4%.

The flux composition can be made and used in conventional ways. The ingredients can be introduced in the form of their oxides or as compounds such as carbonates (for instance lithium carbonate) which form the oxide during production. Conveniently the flux composition is a frit, which can be prepared by melting the ingredients together, quenching to form a glass and granulating. Alternatively, part of the flux composition (for instance part of the $Bi_2O_3$) can be incorporated while admixing a frit consisting essentially of the other ingredients with a pigment to form the glaze or enamel composition. Usually the flux composition is admixed, preferably by milling, with a pigment to form a glaze or enamel composition consisting essentially by weight of 70–90% of the flux composition together with 10–30% pigment, preferably 70–75% of the flux composition together with 15–30% pigment, and especially 75–85% of the flux composition together with 15–25% pigment. The pigment can be conventional. For use on the glass window pane of automotive vehicles, the enamel composition is usually black or grey. The glaze or enamel composition preferably sinters in the range 400°–550° C. It preferably melts in the range 550°–700° C.

The glaze or enamel composition can be applied to an article in the usual way, for instance by printing. It is usually applied in an organic medium, for instance in the form of a paste. The medium can be infra-red drying or ultra-violet curing; such media are known and can be employed in their known ways. The glaze or enamel composition can be fired in the usual way. Preferably, the composition is applied to a glass article and then fired. The composition can be fired in the usual way. Preferably, the composition is applied to a glass article and then fired. The composition can be fired on a glass article at 500°–900° C., preferably 650°–720° C.; the firing time is usually up to 30 minutes. For instance, the firing time can be up to 4 minutes, e.g. 1–4 minutes, when an automotive vehicle window pane having a single sheet of glass is being formed, or 8–30 minutes when an automotive vehicle laminated window pane is being formed.

The glaze or enamel composition can be used particularly to decorate glass, for instance glass bottles and especially glass window panes for automotive vehicles.

As indicated above, the present flux composition and the present glaze or enamel composition are particularly useful for application of the glaze or enamel composition to an article and then firing the composition in contact with a mould surface, particularly to form a glass window pane for an automotive vehicle. Preferably the enamel composition is applied to the surface of glass for a window pane of an automotive vehicle, which glass is then placed onto the bottom half of a mould, and the top half of the mould is then closed onto the glass to bend it into the desired curved shape of the window pane, whereby the composition is fired in contact with a surface of the mould while the mould shapes the glass.

Also as indicated above, the present flux composition and the present enamel composition are particularly useful in addition for application of the enamel composition to an inner surface (for instance the inner surface of the outer sheet) of the two sheets of glass to be employed in the manufacture of laminated window panes for automotive vehicles, and firing the composition in contact with the second sheet while gravity shapes the sheet of glass.

The procedure can be carried out using techniques and materials known in themselves. It can be carried out for instance as follows: A first flat sheet of glass is decorated with the enamel composition, which has been made up in an organic infra-red drying or ultra-violet curing medium; after drying or curing the medium, the decorated glass is pre-heated, preferably to about 350°–450° C., for a short period to burn off the organic materials; a second flat sheet of glass is then placed on the first one, and the assembly fired in a normal firing cycle (for example by being placed on a frame, which is fed into a furnace), but whereby the composition is fired in contact with the second sheet while gravity shapes the sheets of glass. Alternatively, after drying or curing the organic medium in the enamel composition, the two sheets of glass proceed directly into this firing cycle but with the two sheets being slightly apart to enable the organic materials to burn off; when the organic materials have burned off, by which time the temperature has reached preferably about 350°–450° C., the second sheet is allowed to fall onto the first, decorated, sheet, and the firing cycle is then continued until the glass has been shaped. In either case, the firing temperature is preferably 500°–750° C., depending on time. For instance, the assembly can be fed into a furnace whose temperature starts at say 300° C. and increases up to the firing temperature, say 700° C., as the assembly progressively passes into the furnace, and then decreases down to say 100° C. as the assembly progressively passes out of the furnace. The firing cycle usually takes 8–30 minutes.

After firing the composition while shaping the two sheets, the two sheets are separated and the plastic sheet can be inserted between them to form the laminated window pane in the normal way. The plastic sheet in the present laminated window panes can be conventional. It can be for instance of polyvinyl butyral.

A material such as sodium sulphate can be employed to aid separation of the sheets of glass.

To form a heated laminated windscreen, connector strips, for instance of silver provided by silver plate, can be printed onto a layer of the present enamel composition on glass so that they will be hidden by the enamel layer from outside the automotive vehicle. The strips can be as known per se. They can be fired with the enamel composition, for instance as described above. They can connect to an electrically conducting transparent heating coating on the glass, preferably covering substantially all the area of glass not covered by the enamel. The coating can be a thin metallic layer, for instance of tin or titanium, and can be formed in ways known per se. It is applied preferably by vacuum deposition or by pyrolysis. The coating can be formed before or after the enamel composition is applied, but preferably before the connector strips are applied. Preferably, the connector strips form a continuous strip surrounding the coating and toward the perimeter of the glass.

BRIEF DESCRIPTION OF THE DRAWINGS

The accompanying drawings.

Figure 1:
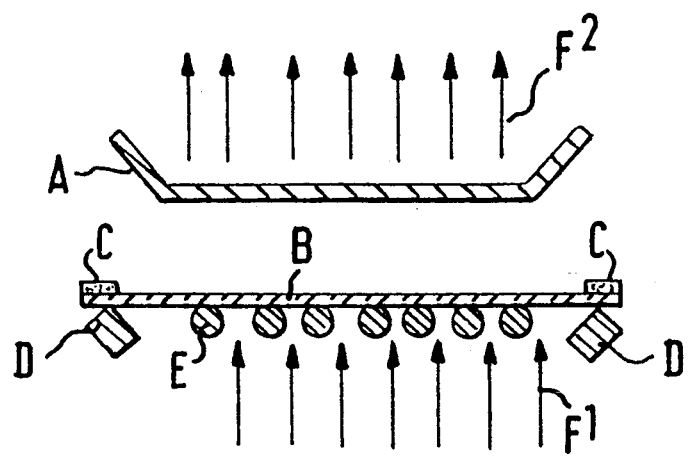
FIGS. 1–4 illustrate part of the present method of forming a window pane for an automotive vehicle, as discussed in Examples 33–50 hereafter.

The invention is illustrated by the following Examples.

EXAMPLE 1

A flux composition consisting in parts by weight of:

| | |
|---|---|
| $SiO_2$ | 34.43 |
| $Bi_2O_3$ | 49.93 |
| $B_2O_3$ | 4.63 |
| $TiO_2$ | 4.83 |
| $Li_2O$ | 3.24 |
| $Na_2O$ | 2.05 |
| $K_2O$ | 0.90 |
| | 100.01 | was prepared by melting the ingredients together, quenching to form a glass and granulating to form a frit.

EXAMPLE 2 AND 3

The flux composition of Example 1 was admixed with the Manganese-Copper-Chrome-Iron-Nickel black ceramic pigment, number 76950 from Blythe Colours B. V., Holland, in the proportion of 20 and 25 parts by weight of the pigment to 80 and 75 parts by weight of the flux composition respectively, by milling to form enamel compositions.

EXAMPLE 4

Example 1 was followed except that 44.93 parts, instead of 49.93 parts, by weight of $Bi_2O_3$ were employed.

EXAMPLES 5 AND 6

The frit of Example 4 was milled with 5 parts by weight of $Bi_2O_3$ and with the pigment defined in Examples 2 and 3, in the same proportions by weight of pigment to total other ingredients as in Examples 2 and 3, to form the same enamel compositions as those of Examples 2 and 3.

EXAMPLES 7 AND 8

The frit of Example 1 was milled with 4 parts by weight of $Bi_2O_3$ and with the pigment defined in Examples 2 and 3, in the same proportions by weight of pigment to total other ingredients as in Examples 2 and 3, to form enamel compositions.

EXAMPLES 9–14

The enamel compositions of Examples 2, 3 and 5–8 were each mixed with an organic medium, in the weight ratio of medium to enamel composition of 1:4.4, and then triple roll milled to form a homogeneous paste, which was screen-printed onto the surface of glass for a window pane of an automobile. The organic medium was an infra-red during medium, number 456/63 from Blythe Colours B. V., Holland, which is a solution of polymethacrylic and formaldehyde resin in a mixture of butanol, aromatic hydrocarbons and pine oil.

EXAMPLES 15–20

Examples 9–14 were followed except that the organic medium was an ultra-violet curing medium, number 473,70 from Blythe Colours B. V., Holland, which is a solution of a mixture of methylmethacrylate-, butylmethacrylate-, and methyacrylate-copolymers and photo-initiator-co-activator-system in N-vinyl-pyrrolidone, iso-decylacrylate, tripropylene glycol diacrylate and glycerylpropoxy-tri-acrylate.

EXAMPLES 21–26

Examples 9–14 were followed except that the organic medium was an ultra-violet curing medium, number 502/70 from Blythe Colours B. V. Holland, which is a solution of an ethyl-acrylate-methylmethacrylate-, butylmethacrylate-copolymer and a photo-initiator-co-activator-system in N-vinyl-pyrrolidone, glyceryl-propoxy-tri-acrylate, iso-decyl-acrylate, tri-methylol-propane-triacrylate and peppermint oil.

EXAMPLES 27–32

Examples 9–14 were followed except that the organic medium was an ultra-violet curing medium, number 510/70 from Blythe Colours B. V. Holland, which is a solution of a methylmethacrylate-, butylmethacrylate-copolymer, a polyester urethane-acrylate and a photinitiator-co-activator-system in N-vinyl-pyrrolidone, glycerylpropoxy-tri-acrylate and peppermint oil.

EXAMPLES 33-50

The organic medium of the printed glass prepared in Examples 15-32 was dried (in the case of the infra-red drying medium) or polymerised (in the case of the ultraviolet curing media). The decorated glass was then fed into a horizontal furnace, where it was quickly heated to about 600°-750° C. The enamel melted onto the glass surface. The glass then passed to the bending section of the furnace, where the temperature of the glass stayed at 620°-750° C. (depending on the glass thickness). In this section, there was a top half of a mould reflecting the desired curved shape of the window pane, and as the bottom half of the mould a press ring under the glass.

The bending operation is illustrated diagrammatically in the accompanying drawings.

Figure 2:
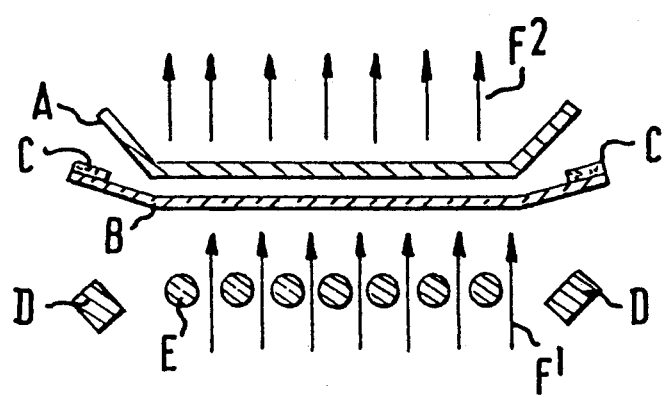
Figure 3:
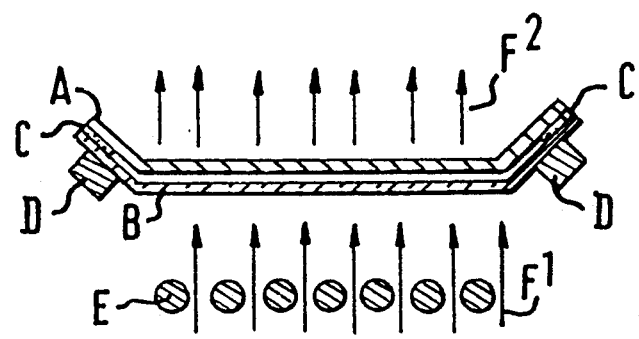
Figure 4:
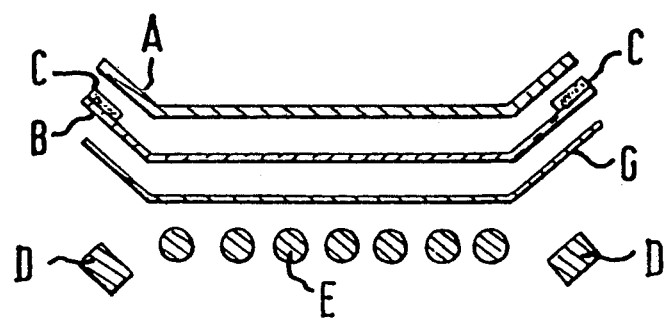

FIG. 1 shows the top half (A) of the mould under which has stopped the glass (B) bearing the enamel (C). The glass is carried along by rollers (E). Under the glass is the press ring (D). Blowing air ($F^1$) from air jets (not shown) under the glass (B) blows it towards the top half (A) of the mould, aided by sucking air ($F^2$) through air jets (not shown) in the top half (A) of the mould. This situation is shown in FIG. 2. The suck air jets in the top half (A) of the mould keep the glass (B) against it. The press ring (D) then presses the glass against the top half (A) of the mould so that the top half (A) is closed onto the glass (B) to bend it into the desired curved shape of the window pane. The top (A) and bottom (D) halves of the mould are at the same temperature as the glass (B). This situation is shown in FIG. 3. After the bending process, the glass (B) is transported out of the furnace on an unloading mould (G), as shown in FIG. 4, into a quench for toughening.

A toughened glass window pane for an automobile was thus formed.

EXAMPLE 51

A flux composition particularly suitable for forming an enamel composition for application to glass and firing in contact with another surface of glass was prepared. The flux composition was a frit consisting in parts by weight of:

| | |
|---|---|
| $Bi_2O_3$ | 58.6 |
| $SiO_2$ | 28.4 |
| $B_2O_3$ | 5.5 |
| $TiO_2$ | 2.7 |
| $Na_2O$ | 2.2 |
| $Li_2O$ | 2.6 |
| | 100.0 |

The frit was prepared by melting together the following ingredients in parts by weight, quenching to form a glass and granulating:

| | |
|---|---|
| $Bi_2O_3$ | 56.7 |
| $SiO_2$ | 27.7 |
| $B_2O_3$ | 5.35 |
| $Li_2CO_3$ | 4.90 |
| $TiO_2$ | 2.37 |
| $NaNO_3$ | 1.68 |
| $NaF$ | 1.29 |

-continued

| | |
|---|---|
| | 99.99 |

EXAMPLE 52

The flux composition of Example 51 was ground with the Manganese-Copper-Chrome-Iron-Nickel black ceramic pigment, number 76950 from Blythe Colours B. V., Holland, in the proportions of 20 parts by weight of the pigment to 80 parts by weight of the flux composition, to form an enamel composition.

EXAMPLES 53-56

The procedure of Examples 9-32 was followed, but using an the enamel composition that of Example 52, to produce a sheet of screen-printed glass for a laminated window pane of an automobile.

After drying (in the case of the infra-red drying medium) or polymerisation (in the case of the ultra-violet curing media), the decorated glass was heated to 350°-450° C. to burn off the organic materials. The second sheet of glass forming the laminating pair was then placed on the decorated side of the glass. The sheets were then placed onto a frame and heated to 550°-700° C. The heat softened the glass, which sank by gravity into the frame, and hence was bent into the desired curved shape. After cooling, the sheets were separated easily, without the enamel having stuck to the second sheet. A polyvinyl butyral layer was inserted between the sheets to form the laminated window pane.

EXAMPLES 57-60

Examples 53-56 were followed except that the shaping by gravity was aided by pressing the hot sheets into the frame.

I claim:

1. In a method of forming a glaze or enamel coated article, the improvement comprising the step of applying a composition comprising 70-90% by weight of a component consisting essentially of, by weight, 45-65% $Bi_2O_3$, 25-36% $SiO_2$, 4-6% $B_2O_3$, 3-6% $TiO_2$, 1-3% $Na_2O$, 0.5-2% $K_2O$, 2-6% $L_2O$ 0-3% $Al_2O_3$, 0-1% $ZrO_2$, 0-1% $BaO$, 0-1% $CaO$, 0-1% $MgO$, 0-1% $ZnO$, 0-3% $PbO$, and 0-0.5% $CdO$ and 10-30% by weight of pigment to the article and then firing the composition.

2. A method according to claim 1 wherein the article is a glass article.

3. A method according to claim 1 wherein the composition is fired in contact with a surface other than that to which it was applied.

4. A method according to claim 3 wherein the other surface is a mold surface, whereby the composition is fired in contact with the mold surface while the mold shapes the article.

5. A method according to claim 2 wherein the composition is fired in contact with a glass surface other than that to which it was applied.

6. A method according to claim 1 wherein the article is a glass window pane for an automotive vehicle.

7. In a method of forming a curved glass window pane for an automotive vehicle, the improvement wherein an enamel composition comprising 70-90% by weight of a component consisting essentially of, by weight, 45-65% $Bi_2O_3$, 25-36% $SiO_2$, 4-6% $B_2O_3$, 3-6 $TiO_2$, 1-3% $Na_2O$, 0.5-2% $K_2O$, 2-6% $Li_2O$, 0-3% $Al_2O_3$, 0-1% $ZrO_2$, 0-1% $BaO$, 0-1% $CaO$, 0-1% $MgO$, 0-1% $ZnO$, 0-3% $PbO$, and 0-0.5% $CdO$ and 10-30% by weight of pigment is applied to the surface of glass for the window pane, which glass is then adapted by two halves of a mold into the curved shape of the window pane while the composition is fired in contact with a surface of the mold.

8. In a method of forming a curved glass laminated window pane for an automotive vehicle, the improvement wherein an enamel composition comprising 70-90% by weight of a component consisting essentially of, by weight, 45-65% $Bi_2O_3$, 25-36% $SiO_2$, 4-6% $B_2O_3$, 3-6% $TiO_2$, 1-3% $Na_2O$, 0.5-2% $K_2O$, 2-6% $Li_2O$, 0-3% $Al_2O_3$, 0-1% $ZrO_2$, 0-1% BaO, 0-1% CaO, 0-1% MgO, 0-1% ZnO, 0-3% PbO, and 0-0.5% CdO and 10-30% by weight of pigment is applied to the surface of one sheet of glass for the laminated window pane, which sheet, together with the second sheet of glass for the laminated window pane, is then shaped by gravity into the curved shape of the window pane while the composition is fired in contact with the second sheet of glass.

9. A method according to claim 1 wherein the component consists essentially of, by weight, 45-65% $Bi_2O_3$, 30-36% $SiO_2$, 4-5% $B_2O_3$, 4-6% $TiO_2$, 1-3% $Na_2O$, 0.5-2% $K_2O$, 2-4% $Li_2O$, 0-3% $Al_2O_3$, 0-1% $ZrO_2$, 0-1% BaO, 0-1% CaO, 0-1% MgO, 0-1% ZnO, 0-3% PbO and 0-0.5% CdO.

10. A method according to claim 1 wherein the component contains 45-55% $Bi_2O_3$.

11. A method according to claim 1 wherein the component is a frit.

12. A method according to claim 9 wherein the component is a frit.

13. A method according to claim 10 wherein the component is a frit.

14. In a method of producing a glass window pane for an automobile vehicle, the improvement comprising the step of applying a composition consisting essentially of 70-90% by weight of a component consisting essentially of, by weight, 45-65% $Bi_2O_3$, 25-36% $SiO_2$, 4-6% $B_2O_3$, 3-6% $TiO_2$, 1-3% $Na_2O$, 0.5-2% $K_2O$, 2-6% $Li_2O$, 0-3% $Al_2O_2$, 0-1% $ZrO_2$, 0-1% BaO, 0-1% CaO, 0-1% MgO, 0-1% ZnO, 0-3% PbO and 0-0.5% CdO and 10-30% by weight of pigment to the surface of glass for the window pane and then firing the composition.

15. The method of claim 1 wherein the composition consists essentially of 70-90% by weight of said component and 10-30% by weight of said pigment.

16. The method of claim 7, wherein the composition consists essentially of 70-90% by weight of said component and 10-30% by weight of said pigment.

17. The method of claim 8, wherein the composition consists essentially of 70-90% by weight of said component and 10-30% by weight of said pigment.

* * * * *

UNITED STATES PATENT AND TRADEMARK OFFICE
CERTIFICATE OF CORRECTION

PATENT NO. : 5,203,902

DATED : April 20, 1993

INVENTOR(S) : Johannes J.W. MURKENS

It is certified that error appears in the above-identified patent and that said Letters Patent is hereby corrected as shown below:

Column 8, line 43, "$L_2O$" should be --$Li_2O$,--.

Column 9, line 3, "adapted" should be --shaped--.

Column 10, line 15, "$Al_2O_2$" should be --$Al_2O_3$--.

Signed and Sealed this

Twenty-fifth Day of January, 1994

Attest:

BRUCE LEHMAN

*Attesting Officer*    *Commissioner of Patents and Trademarks*